United States Patent
Ellerman et al.

(10) Patent No.: US 12,361,774 B2
(45) Date of Patent: Jul. 15, 2025

(54) DYNAMIC CAPACITY MONITORING

(71) Applicant: Tyco Fire & Security GmbH, Neuhausen am Rheinfall (CH)

(72) Inventors: Rachel D. M. Ellerman, Shorewood, WI (US); Vikas Sharma, New Delhi (IN); Sourabh Taranath Joshi, Ambarnath (IN); Ketan Pandhare, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 23 days.

(21) Appl. No.: 17/529,085

(22) Filed: Nov. 17, 2021

(65) Prior Publication Data

US 2022/0309849 A1 Sep. 29, 2022

(30) Foreign Application Priority Data

Mar. 25, 2021 (IN) .............................. 202141013043

(51) Int. Cl.
    G06Q 10/02 (2012.01)
    G07C 9/00 (2020.01)
    G07C 9/25 (2020.01)
    H04W 12/062 (2021.01)
    H04W 12/08 (2021.01)

(52) U.S. Cl.
    CPC ..... *G07C 9/00309* (2013.01); *G07C 9/00563* (2013.01); *G07C 9/257* (2020.01); *H04W 12/062* (2021.01); *H04W 12/08* (2013.01)

(58) Field of Classification Search
    CPC .......... G07C 9/00309; G07C 2209/08; H04W 12/062; H04W 12/08; G06Q 10/02
    See application file for complete search history.

(56) References Cited

U.S. PATENT DOCUMENTS

| | | | |
|---|---|---|---|
| 2010/0243976 A1* | 9/2010 | Crucs | E04H 15/34 348/143 |
| 2020/0064790 A1* | 2/2020 | Galvez | G06Q 50/163 |
| 2020/0349249 A1* | 11/2020 | Weston | G06V 40/171 |
| 2021/0193309 A1 | 6/2021 | Boisvert et al. | |
| 2021/0390807 A1 | 12/2021 | Chaurasia et al. | |
| 2021/0390812 A1 | 12/2021 | Chaurasia et al. | |
| 2021/0391089 A1 | 12/2021 | Eswara et al. | |

(Continued)

FOREIGN PATENT DOCUMENTS

WO   WO-2021/258116 A1   12/2021

*Primary Examiner* — Vernal U Brown
(74) *Attorney, Agent, or Firm* — Foley & Lardner LLP

(57) ABSTRACT

A method for providing access to a building for a user is shown. The method includes determining a capacity restraint for the building, the capacity restraint including a maximum number of occupants allowed within the building. The method includes receiving a request to reserve a space in the building from the user. The method includes determining whether to grant the request based on the capacity restraint and current reservations within the building. The method includes, responsive to determining to grant the request, automatically providing credentials to at least one of an access control system of the building or a device of the user, the credentials configured to cause the access control system to grant access to the user in accordance with one or more parameters of the reservation.

20 Claims, 15 Drawing Sheets

(56) References Cited

U.S. PATENT DOCUMENTS

| | | |
|---|---|---|
| 2021/0398659 A1 | 12/2021 | Sharma et al. |
| 2021/0398690 A1 | 12/2021 | Gibson et al. |
| 2021/0398691 A1 | 12/2021 | Dhamija et al. |
| 2022/0036258 A1* | 2/2022 | Leach .................... G06Q 30/08 |
| 2022/0060856 A1 | 2/2022 | Wellig et al. |

* cited by examiner

DYNAMIC CAPACITY MONITORING

CROSS-REFERENCE TO RELATED APPLICATION

This application claims the benefit of and priority to Indian Provisional Application No. 202141013043, filed Mar. 25, 2021, which is incorporated herein by reference in its entirety.

BACKGROUND

The present disclosure relates generally to building management systems (BMS). More specifically, the present disclosure relates generally to using a BMS to monitor maximum capacity to facilitate access to a campus, building, or portion thereof.

Some buildings may be restricted to a capacity threshold for safety purposes (e.g., under pandemic, such as COVID-19, restrictions, for fire safety purposes, etc.). The real-time capacity in the building can vary over time. Requested building occupants may want to know if and when they are allowed to access the building. As such, there exists a need to provide conditional access to building occupants that that conforms to the capacity restrictions imposed on the building.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for providing access to a building for a user. The method includes determining a capacity restraint for the building, the capacity restraint including a maximum number of occupants allowed within the building. The method includes receiving a request to reserve a space in the building from the user. The method includes determining whether to grant the request based on the capacity restraint and current reservations within the building. The method includes, responsive to determining to grant the request, automatically providing credentials to at least one of an access control system of the building or a device of the user, the credentials configured to cause the access control system to grant access to the user in accordance with one or more parameters of the reservation.

In some embodiments, causing the access control system to grant access to the user in accordance with the one or more parameters includes granting access in accordance with at least one of a time of the reservation, a date of the reservation, a security level of the user, or a health assessment of the user.

In some embodiments, determining whether to grant the request based on the capacity restraint and current reservations includes verifying that the request to reserve the space conforms to capacity restrictions provided by a regulatory entity, the capacity restrictions comprising the capacity restraint.

In some embodiments, automatically providing the credentials to the at least one of the access control system of the building or the device of the user includes determining a level of access associated with at least one of the request or the credentials and the credentials are configured to cause the access control system to selectively grant access based on the level of access.

In some embodiments, receiving the request to reserve the space in the building includes receiving the request via a mobile application on the device of the user In some embodiments, providing the credentials to at least one of the access control system of the building or the device of the user includes providing the credentials for a duration of time, the duration of time limited based on at least one of the capacity restraint and current reservations within the building.

In some embodiments, automatically providing the credentials to at least one of the access control system of the building or the device of the user includes providing the credentials to the device of the user via a mobile application, receive, via the mobile application, the request to modify the request to reserve the space, determining whether to grant the modified request based on the capacity restraint and current reservations within the building, and responsive to determining to grant the request, providing a notification to the device of the user that the request has been granted.

Another implementation of the present disclosure is a access control system (ACS) for providing access to a building for a user. The ACS includes a controller, the controller includes a processing circuit configured to, determine a capacity restraint for the building, the capacity restraint comprising a maximum number of occupants allowed within the building, receive a request to reserve a space in the building from the user, determine whether to grant the request based on the capacity restraint and current reservations within the building, responsive to determining to grant the request, automatically provide credentials to at least one of an access control system of the building or a device of the user, the credentials configured to cause the access control system to grant access to the user in accordance with one or more parameters of the reservation.

In some embodiments, causing the access control system to grant access to the user in accordance with the one or more parameters includes granting access in accordance with at least one of a time of the reservation, a date of the reservation, a security level of the user, or a health assessment of the user.

In some embodiments, determining whether to grant the request based on the capacity restraint and current reservations includes verifying that the request to reserve the space conforms to capacity restrictions provided by a regulatory entity, the capacity restrictions comprising the capacity restraint.

In some automatically providing the credentials to the at least one of the access control system of the building or the device of the user includes determining a level of access associated with at least one of the request or the credentials and the credentials are configured to cause the access control system to selectively grant access based on the level of access.

In some embodiments, receiving the request to reserve the space in the building includes receiving the request via a mobile application on the device of the user.

In some embodiments, providing the credentials to at least one of the access control system of the building or the device of the user includes providing the credentials for a duration of time, the duration of time limited based on at least one of the capacity restraint and current reservations within the building.

In some embodiments, automatically providing the credentials to at least one of the access control system of the building or the device of the user includes providing the credentials to the device of the user via a mobile application, receiving, via the mobile application, the request to modify the request to reserve the space, determining whether to grant the modified request based on the capacity restraint and current reservations within the building, and responsive to determining to grant the request, providing a notification to the device of the user that the request has been granted.

Another implementation of the present disclosure is one or more non-transitory computer readable media having instructions stored thereon that, when executed by the one or more processors, cause the one or more processors to implement operations. The operations include determining a capacity restraint for the building, the capacity restraint including a maximum number of occupants allowed within the building, receiving a request to reserve a space in the building from the user, determining whether to grant the request based on the capacity restraint and current reservations within the building, verifying that the request to reserve the space conforms to capacity restrictions provided by a regulatory entity, the capacity restrictions comprising the capacity restraint, and responsive to determining to grant the request, automatically providing credentials to at least one of an access control system of the building or a device of the user, the credentials configured to cause the access control system to grant access to the user in accordance with one or more parameters of the reservation.

In some embodiments, causing the access control system to grant access to the user in accordance with the one or more parameters includes granting access in accordance with at least one of a time of the reservation, a date of the reservation, a security level of the user, or a health assessment of the user.

In some embodiments, automatically providing the credentials to the at least one of the access control system of the building or the device of the user includes determining a level of access associated with at least one of the request or the credentials and the credentials are configured to cause the access control system to selectively grant access based on the level of access.

In some embodiments, receiving the request to reserve the space in the building includes receiving the request via a mobile application on the device of the user.

In some embodiments, providing the credentials to at least one of the access control system of the building or the device of the user includes providing the credentials for a duration of time, the duration of time limited based on at least one of the capacity restraint and current reservations within the building.

In some embodiments, automatically providing the credentials to at least one of the access control system of the building or the device of the user includes providing the credentials to the device of the user via a mobile application, receiving, via the mobile application, the request to modify the request to reserve the space, determining whether to grant the modified request based on the capacity restraint and current reservations within the building, and responsive to determining to grant the request, providing a notification to the device of the user that the request has been granted.

DETAILED DESCRIPTION

Overview

Referring generally to the FIGURES, systems and methods for receiving one or more access requests to enter a building (e.g., at a time during the current day or a future date) and processing the request while considering one or more constraints, such as a maximum capacity that the building is required to conform to implementing. Several factors apart from maximum building capacity may also be taken into account (e.g., reservation location preference, etc.) to determine a conditional access response to the request. In some embodiments, the conditional access response provides a frictionless (e.g., simple and efficient means, etc.) method for the potential building occupant to enter the building at a time, a date, a location, and/or a duration that conforms to the one or more constraints (e.g., maximum capacity, etc.) considered by the system.

Building Management System and HVAC System

HVAC System

Figure 1:
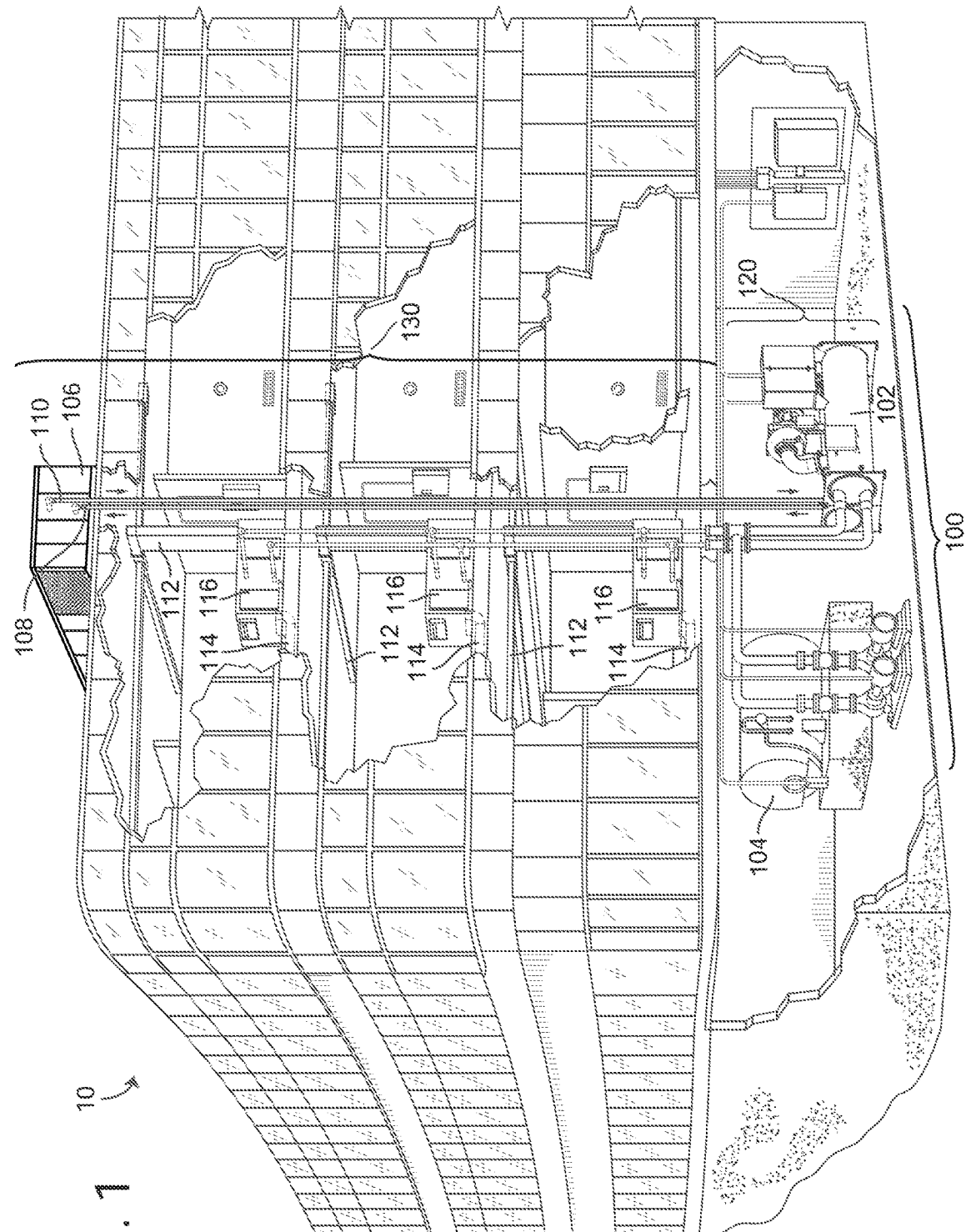
FIG. 1 is a schematic drawing of a building equipped with an HVAC system, according to some embodiments.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.).

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Waterside System

Figure 2:
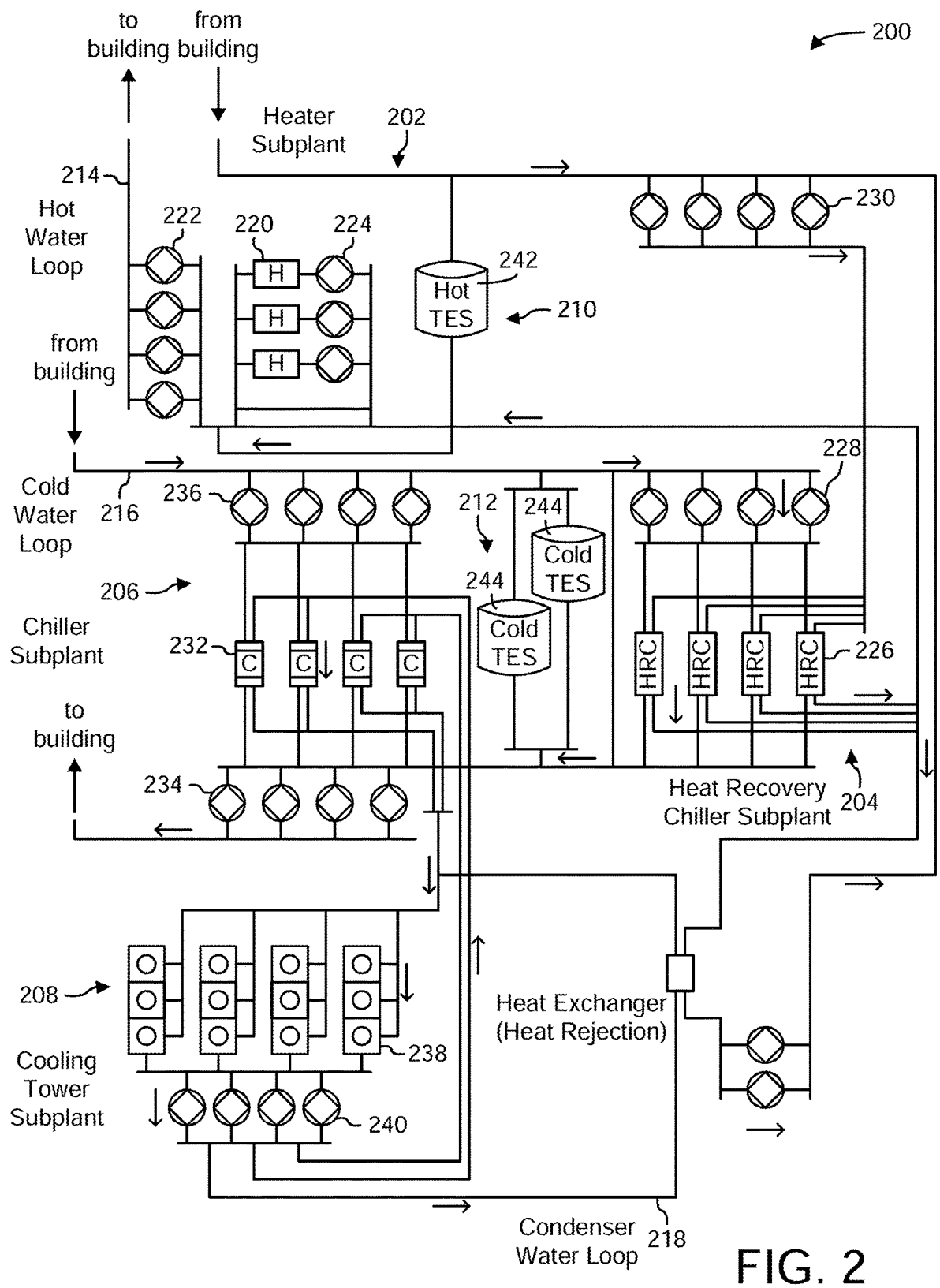
FIG. 2 is a schematic drawing of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
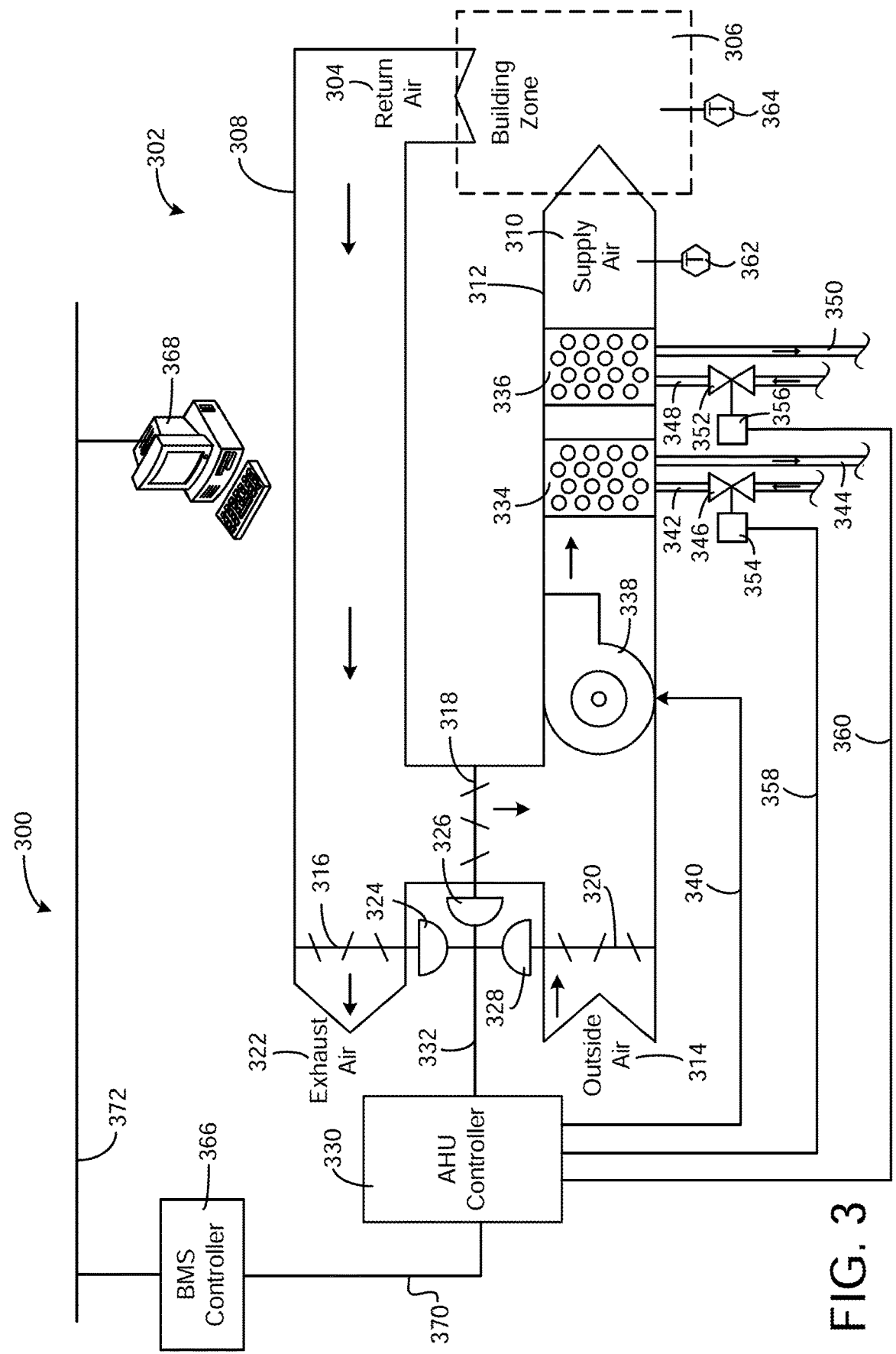
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flowrate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
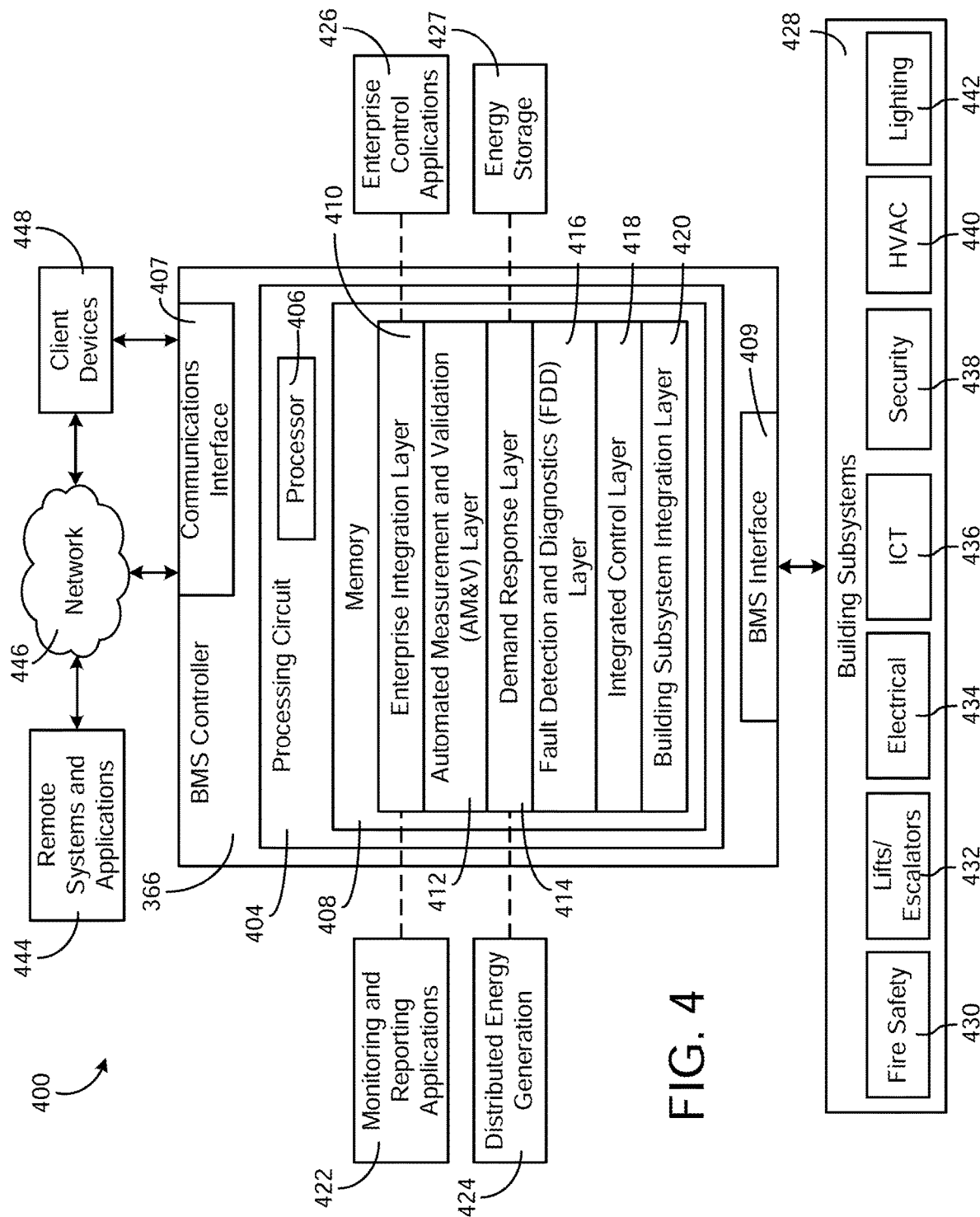
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application-specific integrated circuit (ASIC), one or more field-programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints)

which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Capacity-Based Conditional Access
Overview

Figure 5:
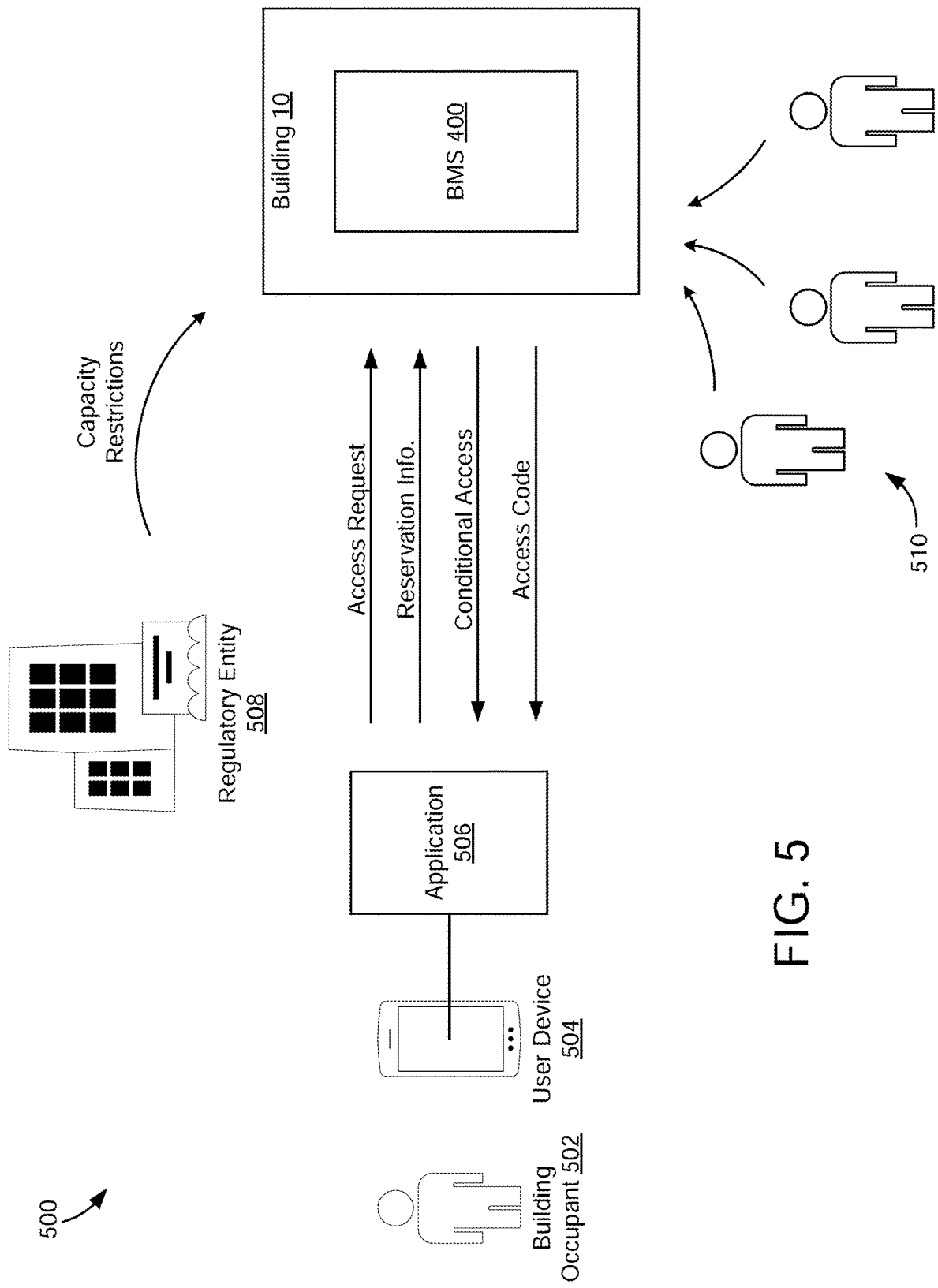
FIG. 5 is a block diagram of a system for facilitating capacity-based conditional access for potential building occupants, according to some embodiments.

Referring now to FIG. 5, a system 500 for providing conditional access to potential building occupants based on a capacity restrictions is shown, according to some embodiments. System 500 is shown to include potential building occupant 502 ("building occupant 502"), user device 504, application 506, regulatory entity 508, building 10 including BMS 400, and other potential occupants 510. In some embodiments, system 500 includes building 10 and the various systems therein.

Building occupant 502 may be a potential occupant within building 10. In some embodiments, building occupant 502 is a building employee, a client, a visitor, or any other type of occupant in a building. Building occupant 502 may have application 506 on the user device of the building occupant (i.e., user device 504). The application 506 may be hosted on the user devices of any number of other potential building occupants (e.g., other potential occupants 510, etc.) and building occupants already within building 10.

Via the application 506, building occupant 502 may be able to request access into building 10. This may include requesting a location within building 10 for a present or future time, requesting a workspace (e.g., a particular desk, a meeting room, etc.), requesting access for multiple occupants (e.g., several people coming for a meeting, etc.), or any combination thereof, The information may be provided over a network (e.g., network 446, etc.) to building 10.

Building 10 may also receive capacity restrictions (e.g., from regulatory entity 508, etc.). In some embodiments, regulatory entity 508 (e.g., a local government, state government, federal government, etc.) may impose capacity restrictions on building 10 such that building 10 is not legally allowed to maintain full capacity of occupants within. In some embodiments, this includes a number cap (e.g., 450 occupants, etc.), a percentage (e.g., 50% capacity, etc.) or a combination thereof. Building 10 may be configured to receive this capacity restriction information, along with the access request information from building occupant 502, and determine if and when building occupant 502 is allowed to enter building 10. In some embodiments, the system configured to facilitate the conditional access for building occupant 502 (e.g., BMS 400, etc.) requests additional data from the building occupant, apart from the requested access time and data. For example, BMS 400 may request that building occupant 502 provide his/her reason for entering building 10 (e.g., meeting, just prefer to work in the office, etc.). In another example, BMS requests that building occupant 502 answer one or more health-related questions that ensure the building occupant 502 is healthy prior to entering building 10. This may be minimize the risk of spreading contagious diseases, such as COVID-19 (e.g., which can be the reasoning for imposing the capacity restrictions from regulatory entity 508, etc.).

After processing (discussed in detail below), BMS 400 may provide conditional access to building occupant 502 via application 506. In some embodiments, this includes specific access to locations (e.g., can enter Zone A, but not Zone B, etc.), as time range for which access is allowed, a particular workspace that the building occupant 502 is required to work at, or any combination thereof. Upon indicating that conditional access has been provided to building occupant 502, an access code may also be provided to building occupant 502, wherein the access code provides electronic means for the building occupant 502 to enter into building 10 and/or into a zone within building 10. The access code may be an automatically generated optical code (e.g., barcode, quick response (QR) code, etc.) and facilitates simple and secure access throughout building 10.

System 500 is also shown to include other potential occupants 510. Any number of potential building occupants may attempt to request access to building 10 and BMS 400 may manage several requests simultaneously and/or over a period of time while conforming to the capacity restrictions imposed thereon. In some embodiments, other potential occupants 510 are building employees requesting access to building 10 to for a meeting, and the access request includes a meeting request to reserve one or more meeting rooms within building 10. In other embodiments, other potential occupants 510 are retail customers and building 10 is a retail store, and other potential occupants 510 are requesting access to enter the retail store at a future time (e.g., 2 hours from now, 12 hours from now, etc.). These and other embodiments are discussed in greater detail below.

Conditional Access Control

Figure 6:
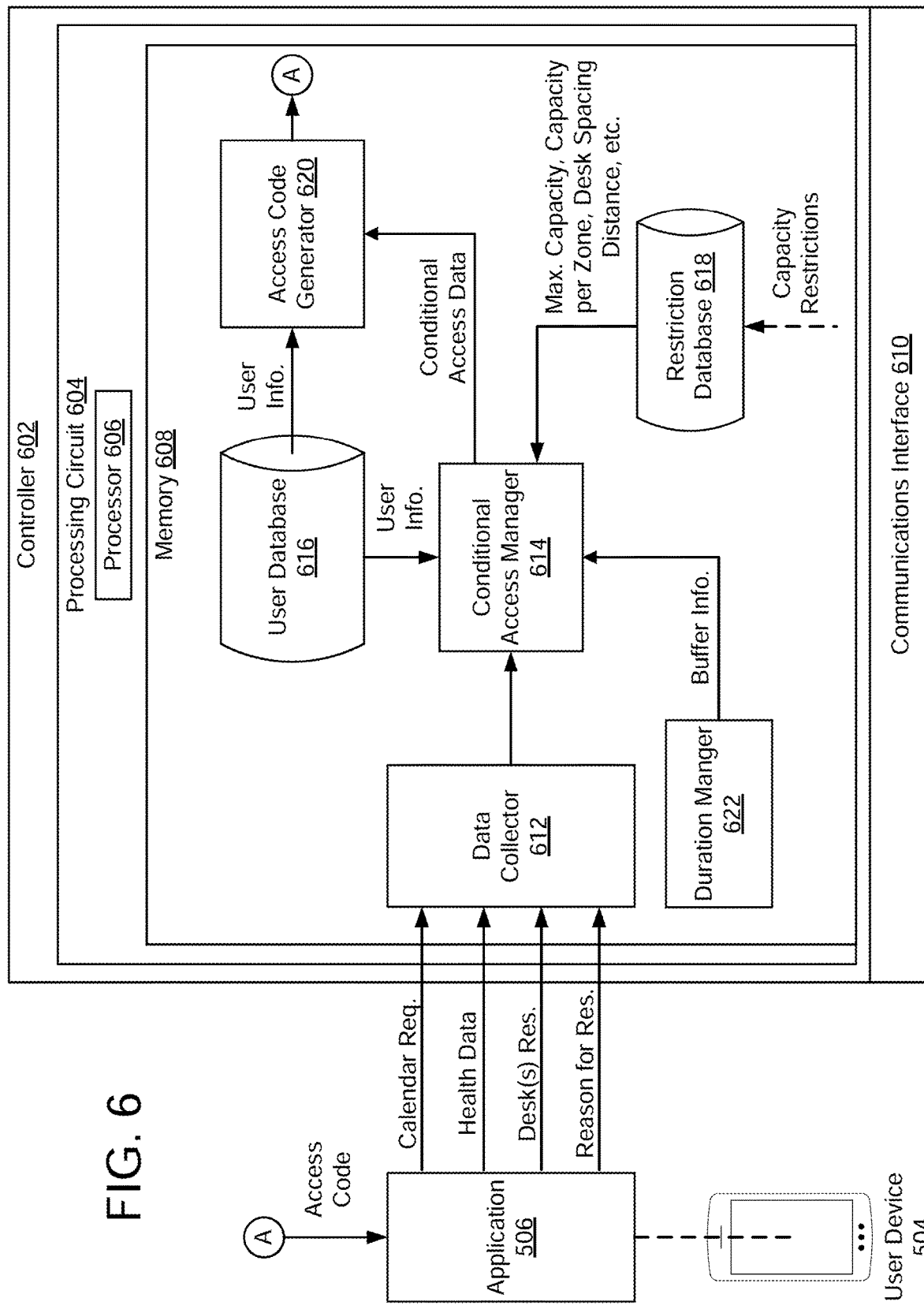
FIG. 6 is a block diagram of a controller for providing capacity-based conditional access for potential building occupants, which can be included in the system of FIG. 5, according to some embodiments.

Referring now to FIG. 6, a block diagram of controller 602 is shown, according to some embodiments. Controller 602 may be configured to receive one or more access requests and other data from potential building occupants and make control decisions based at least in part on the received data from the building occupants. Controller 602 may be incorporated within BMS 400, or any of the other systems disclosed herein (e.g., HVAC system 100, waterside system 200, airside system 300, etc.). In some embodiments, controller 602 is implemented within a single computer (e.g., one server, one housing, etc.). In various other embodiments controller 602 can be distributed across multiple servers or computers (e.g., that can exist in distributed locations, etc.). Controller 602 is shown to include processing circuit 604 including processor 606 and memory 508 and communications interface 610.

Communications interface 610 can facilitate communications between controller 602 and external applications (e.g., application 506, etc.) for allowing control, monitoring, and adjustment to controller 602 and/or subsystems 428. Communications interface 610 can facilitate communications between controller 602, building subsystems 428 (e.g., HVAC, lighting security, lifts, power distribution, business, etc.), and other subsystems or subsystem components within system 500.

Communications interface 610 can be or include wired or wireless communications interfaces (e.g., jacks, antennas, transmitters, receivers, transceivers, wire terminals, etc.) for conducting data communications within system 500 or other external systems or devices. In various embodiments, communications via communications interface 610 can be direct (e.g., local wired or wireless communications) or via a communications network 446 (e.g., a WAN, the Internet, a cellular network, etc.). For example, communications interface 610 can include an Ethernet card and port for sending and receiving data via an Ethernet-based communications link or network. In another communications interface 610 can include a Wi-Fi transceiver for communicating via a wireless communications network.

Processing circuit 604 can be communicably connected to communications interface 610 such that processing circuit 604 and the various components thereof can send and receive data via communications interface 610. Processor 606 can be implemented as a general purpose processor, an application-specific integrated circuit (ASIC), one or more field-programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can include database components, object code components, script components, or any other type of information structure for supporting the various activities and information structures described in the present application. According to an exemplary embodiment, memory 608 is communicably connected to processor 606 via processing circuit 604 and includes computer code for executing (e.g., by processing circuit 604 and/or processor 606) one or more processes described herein. Memory 608 is shown to include data collector 612, conditional access manager 614, user database 616, restriction database 618, access code generator 620, and duration manager 622.

Data collector 612 may be configured to receive any and all data from one or more potential building occupants of building 10. In some embodiments, this data is provided by the potential building occupants to controller 602 via application 506. The user may input one or more requests into the application 506. For example, a building employee may have an on-site meeting at building 10. The building employee—via application 506—requests a meeting room reservation for himself and 3 other employees that will also be attending in person (e.g., as opposed to virtually). This data may be provided to data collector 612. Data collector 612 may be configured to provide the appropriate data to conditional access manager 614.

Conditional access manager 614 may be configured to receive the access requests from the potential building occupants and make decisions on conditional access for the potential building occupants while considering the capacity restrictions, but also potentially considering a host of other factors (e.g., available rooms within building 10, contact tracing, contaminated zones, security level access, current health, reason(s) for entering building 10, etc.). In some embodiments, conditional access manager 614 receives user information from user database 616. This user information can include the potential building occupant's security level (e.g., are they allowed to access the requested area, etc.), health history (e.g., have they been exposed to or tested positive for COVID-19, etc.), and/or preferred workspace location (e.g., a particular desk or room that they prefer to work in, etc.).

Conditional access manager 614 may also be configured to receive buffer information from duration manager 622. In some embodiments, controller 602 may impose time limitations on the access requests made from potential building occupants. For example, if a building employee wishes to work within building 10 at their preferred workplace station from 10:00 AM-12:00 PM, controller 602 may only allow access into building 10 from 9:50 AM-10:10 PM, and may provide a notification to the building employee (e.g., via application 506, via text message, etc.) after the reservation has passed (e.g., 12:15 PM, etc.) that the building occupant is now required to leave building 10. This can maintain an accurate and consistent monitoring of the real-time capacity within building 10.

Conditional access manager 614 may also be configured to receive data relating to the workplace restrictions from restriction data base 618. This data may include the actual restrictions that building 10 is required to conform to, but may also include other restriction data that may or may not be from regulatory entity 508, such as capacity per building zone, desk spacing requirements, contact tracing requirements, and acceptable reasons for entering building 10.

Conditional access manager 614 can be configured to provide conditional access back to application 506. In the example, the building employee has an on-site meeting at building 10. The building employee requested a meeting room reservation for himself and 3 other employees that will also be attending in person. Conditional access manager 614 may determine that the four employees can reserve a meeting, but not the meeting room they requested, as that meeting room was previously contaminated due to COVID-19 exposure. Additionally, one of the four employees is prevented from entering the building for two weeks, as the employee in question indicated that they had been exposed to COVID-19 recently. Thus, the earliest that the meeting can be held is two weeks in the future, in the specified meeting room. This information may be provided to the building occupant who made the request (e.g., and the other building employees attending the meeting, etc.) via application 506. While application 506 is shown to be outside of controller 602, application 506 may be stored and processed within controller 602 and the application interface is hosted on user device 502.

Conditional Access Processes

Figure 7A:
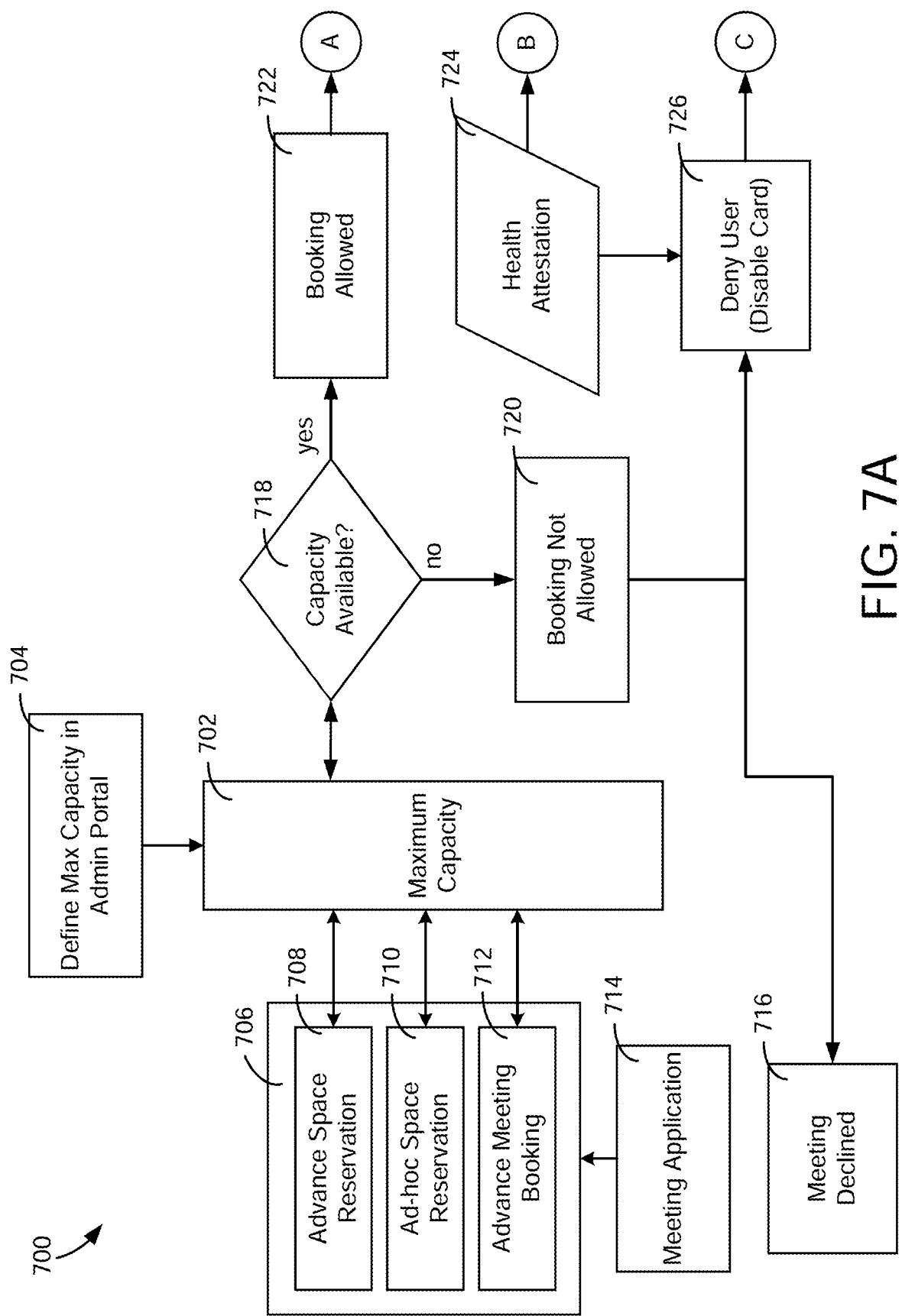
FIG. 7A is a flow diagram of a process for performing capacity-based conditional access for potential building occupants, which can be implemented by the controller of FIG. 6, according to some embodiments.

Referring now to FIG. 7A, a flow diagram of process 700 is shown, according to some embodiments. The methods of process 700 can be performed by any of the processing devices disclosed herein, such as controller 602. In some embodiments, the data transfer and/or operations within process 700 are performed at least in part by application 506, which may be stored within controller 602 and hosted on user device 504. In some embodiments, process 700 provides conditional access to a building employee attempting to schedule a meeting via application 506.

Process 700 is shown to include defining maximum capacity 702 in an administration portal (step 704). In some embodiments, one or more building managers, building technicians, and/or building engineers provides administrative control over process 700 and/or controller 602. As such, the maximum capacity 702 (e.g., as imposed by regulatory entity 508, etc.) can be defined within application 506. In other embodiments, the maximum capacity 702 is automatically implemented in application 506 upon being received from regulatory entity 508. Reservation block 706 is shown to include advance space reservation 708, ad-hoc space reservation 710, and advance meeting booking 712. These reservations may be provided by meeting application 714. In some embodiments, meeting application 714 may be identical or substantially similar to application 506.

Advance space reservation 708 may be a reservation for a particular workspace or other space in the building, such as a workstation or cubicle, office, conference room, etc. In some embodiments, advance space reservation 708 may be a reservation of a space for a single person. In some embodiments, advance space reservation 708 may be a reservation for a space for multiple people but outside the context of a scheduled meeting. In some embodiments, advance space reservation 708 is a reservation for a space at a future date and/or time, such that the space is considered booked in advance.

Ad-hoc space reservation 710 may be a reservation for a particular workspace or other space in the building outside of the context of a reservation scheduled in advance. For example, an ad-hoc space reservation 710 may be a reservation made upon arrival at the building or campus, such as with a reception desk or via an application. In some embodiments, ad-hoc space reservation 710 may be for a current time or a time in the near future.

Advance meeting booking 712 may be a reservation for a meeting. Advance meeting booking 712 may, in some embodiments, include an amount of people anticipated to attend the meeting or invited to the meeting and/or various other parameters for the meeting, such as a requested particular meeting space, amenities requested for the meeting, required equipment for the meeting such as a projector, etc. In some embodiments, advance meeting booking 712 may identify one or more of the participants in the meeting.

In various embodiments, any of advance space reservation 708, ad-hoc space reservation 710, and/or advance meeting booking 712 may include employees or people otherwise affiliated with or having access privileges to the building/organization as well as visitors/guests. Process 700 and/or the other embodiments described herein may account for both the employees/affiliates and the visitors/guests in the capacity assessment as well as provide access privileges for any allowed bookings, as described in further detail below.

In some embodiments, a determination as to whether there is booking allowed at a current or future date (step 718) is based on comparing the host of current and/or future reservations (e.g., ad-hoc space reservations, etc.) to the maximum capacity 702 that has been defined. In some embodiments, the maximum capacity imposed by regulatory entity 508 may be different than the maximum capacity 702 defined in process 700 (e.g., within application 506, etc.). For example, a building manager of building 10 may prefer to provide a "buffer" of maximum capacity 702 (e.g., 90% of the capacity imposed by regulatory entity 508), to allow for the possibility that random people walk up to building 10 and attempt to enter the building.

In response to determining that there is not capacity available for the requested meeting, a notification may be sent to the potential building occupant that booking is not allowed (step 720). If there is capacity available, booking may be allowed (step 722). Subsequently, the user's badge or access code may be disabled (step 726) for entering building 10 and a notification may be received indicating that the meeting reservation has been declined (step 716). In response to determining that there is capacity available for booking, a notification may be sent to the potential building occupant that booking is allowed. In some embodiments, the potential building occupants requesting access to building 10 may be required to provide their health information via one or more health questionnaires, (step 724). In some embodiments, if there are no issues with the received health information, the potential building occupants may be allowed to progress forward (step 734). Any indication that the potential building occupant has been exposed to a contagious disease may affect possibility of receiving an allowed booking.

In various implementations, the determination of whether capacity is available in step 718 may be based on a dynamic assessment of the current and/or anticipated future capacity based on existing bookings. For example, in some embodiments, the anticipated capacity for a particular time period may be based on a combination of the existing bookings for advance space and meeting reservations as well as any current or anticipated ad-hoc bookings. If the total of the reservations is not less than the maximum capacity 702, the booking may be denied. In some embodiments, the system may maintain a buffer under the maximum capacity 702, for example, to allow for unanticipated VIPs to be granted entry. For example, the system may reserve a threshold amount or percentage of the available maximum capacity 702 (e.g., 20 people, five percent, etc.), and if granting a booking request would cause the capacity for the requested time period to exceed the threshold amount under the maximum capacity 702, the request may be denied.

In some embodiments, the available capacity and/or current occupancy for a particular time period may be dynamically determined based on changing conditions associated with the bookings. For example, if a meeting is booked in advance with an anticipated attendance of 20 people, the meeting may be initially counted as 20 occupants against the capacity limit. If ten invitees subsequently reply that they will not attend, the occupancy count for the meeting may be adjusted down to ten. Similarly, if an additional five individuals are subsequently invited, the occupancy count for the meeting may be increased to 15. Such a feature may also apply to space reservations; if a space is reserved for two people and a third person is added to the reservation, the system may associate an anticipated occupancy of three instead of two with the booking after the change. The system may additionally or alternatively enforce the maximum capacity 702 to changes in bookings; for example, if an organizer of a meeting that was originally approved subsequently changes the attendee number from 20 to 50, and that change would cause the anticipated occupancy to exceed the maximum capacity 702 or enforced threshold under the maximum capacity, the system may inform the organizer that the change is denied and/or the meeting request has been cancelled.

While the foregoing discussion focuses on enforcing maximum capacity of buildings, it should be understood that the maximum capacity enforcement may apply to campuses of multiple buildings or to sub-units of buildings, such as a floor, room, etc. For example, the features disclosed herein could be used to prevent a number of occupants in a large exposition or conference room from exceeding a maximum capacity without necessarily imposing a capacity limit on an overall building in which the exposition/conference room is enclosed.

Figure 7B:
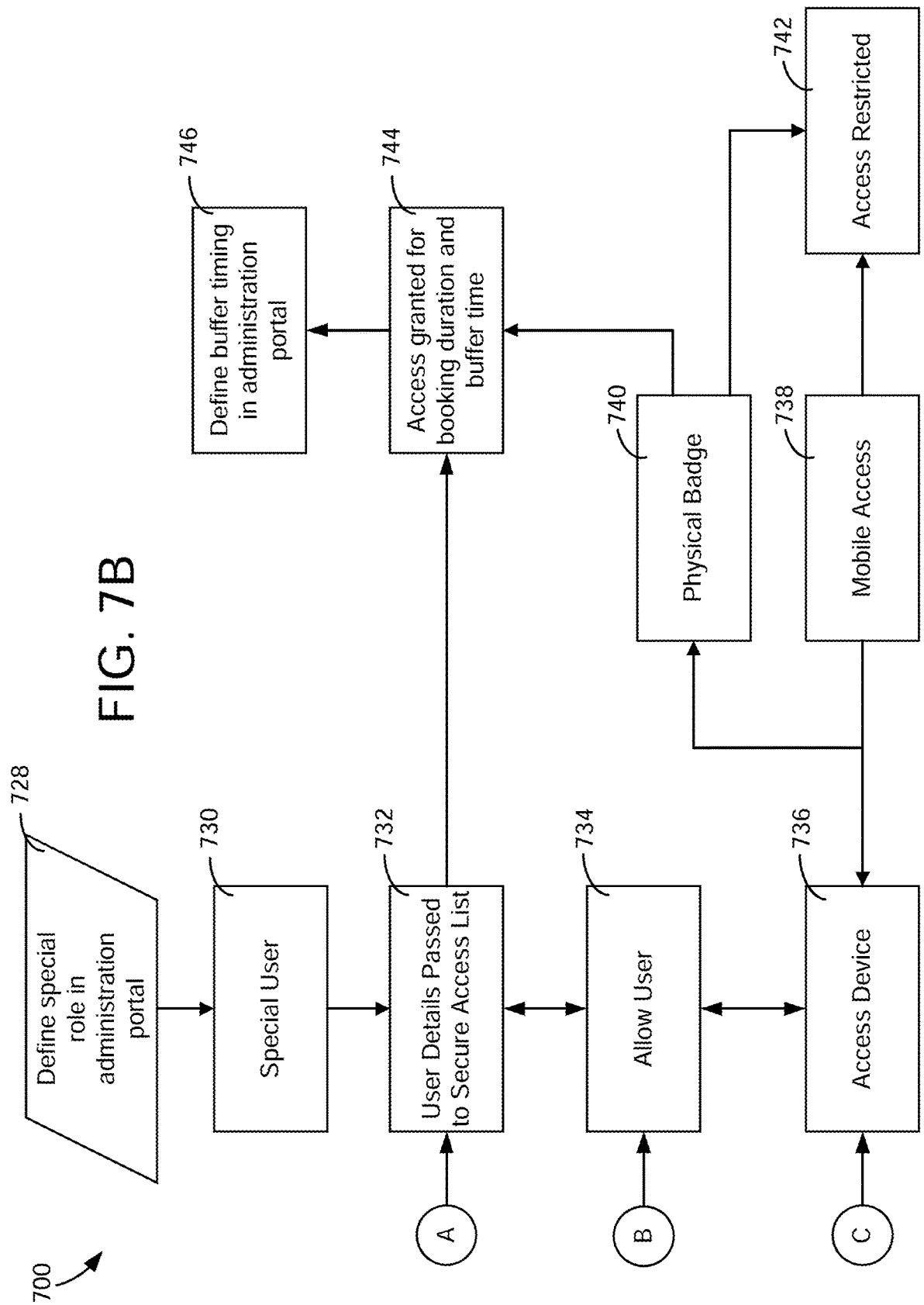
FIG. 7B is a flow diagram of a process for performing capacity-based conditional access for potential building occupants, which can be implemented by the controller of FIG. 6, according to some embodiments.

Referring now to FIG. 7B, process 700 is shown to continue from FIG. 7A. In some embodiments, a special (e.g., supervisory role, etc.) may be defined on the back-end of application 506 (steps 728-730). This may allow an administrator to access application 506 and make supervisory decisions based on the information received from the potential building occupant. For example, the administrator may see that booking is technically allowed for the potential building occupant, but with a recent and unverified COVID exposure in building 10, the administrator may access application 506 and postpone the requested meeting of the potential building occupant for safety purposes. In some embodiments, the user details are passed to a list of users that allowed access to building 10 (step 732).

In some embodiments, once the user is allowed access to the building, a the system updates the access device 736 such that the user's user device 502 will now allow the user to enter the building. This may include providing the user with a generated optical code that is specifically generated to provide the conditional access determined for that particular building occupant. For example, the potential building occupant may receive a generated QR code via application 506 that, when scanned at the door of building 10, only allows access at or near the time of their reservation. Furthermore, the generated QR code can be used to provide access to rooms or zones within building 10 that is conditionally allowed for the user (e.g., potential building occupant, etc.). This is shown in steps 736-742 in process 700.

Process 700 is shown to include defining a buffer timing in administration portal (step 746) and providing granted access for booking duration and buffer time (step 744). In some embodiments, duration manager 622 is configured to provide buffer timing to the potential building occupant such that the potential building occupant does not stay unnecessarily long after the reservation, which could result in negatively impacting the monitoring of the real-time capacity within building 10. This buffering functionality may be integrated with the generated access code for the potential building occupant, similar to the reservation times and dates as described above.

Figure 8A:
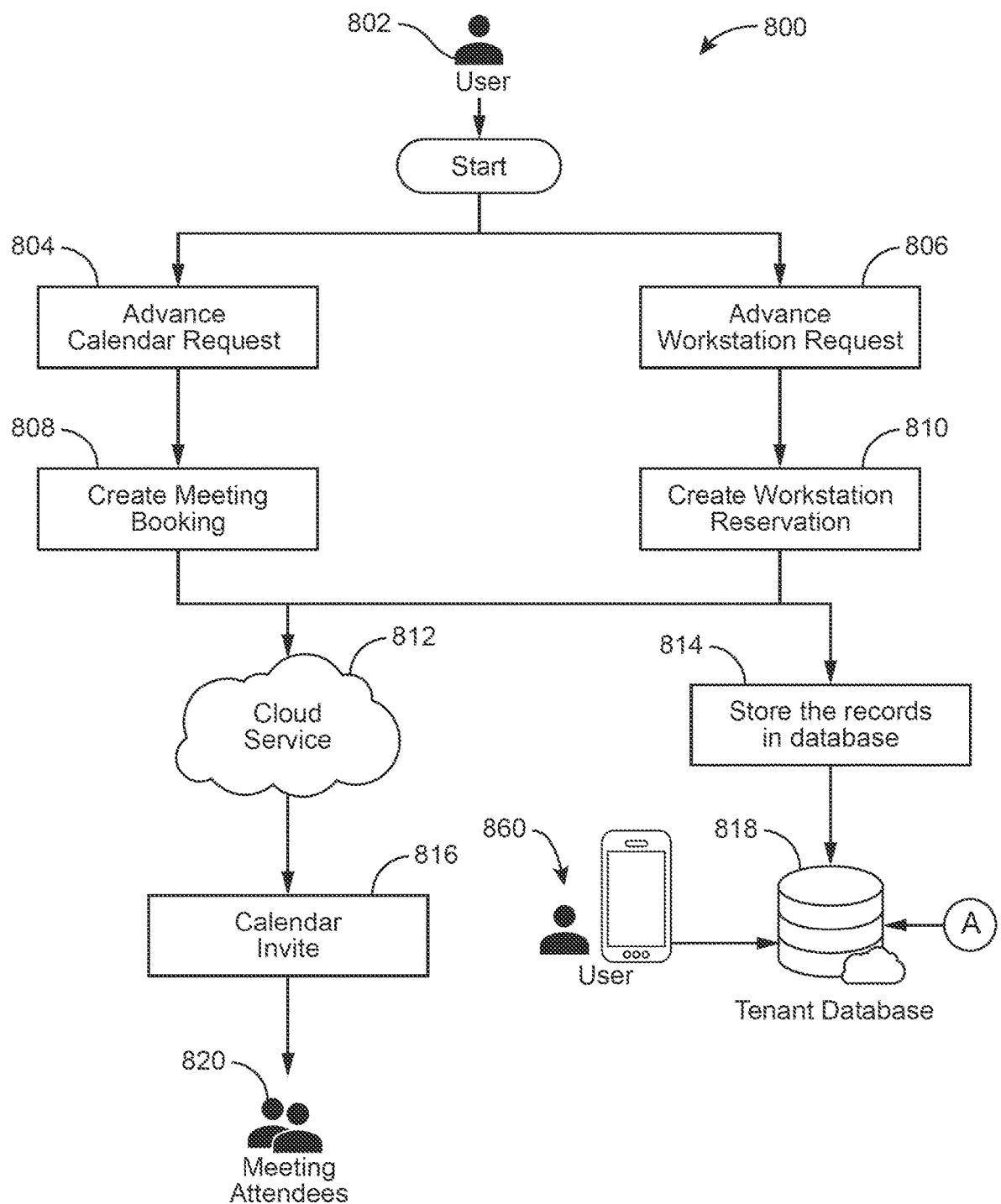
FIG. 8A is a flow diagram of a process providing an access request to a building, which can be implemented by the controller of FIG. 6, according to some embodiments.

Referring now to FIG. 8A, a flow diagram of a process 800 for requesting and attending a meeting based on capacity-based conditional access is shown, according to some embodiments. The methods of process 800 can be performed by any of the processing devices disclosed herein, such as controller 602. In some embodiments, the data transfer and/or operations within process 800 are performed at least in part by application 506, which may be stored within controller 602 and hosted on user device 504. In some embodiments, process 800 provides conditional access to a building employee attempting to schedule a meeting via application 506.

Process 800 is shown to include user 802 advancing a calendar request (step 804) and advancing a workstation request (step 806). Process 800 is shown to include creating a meeting booking (step 808). Process 800 is shown to include creating a workstation reservation (step 810) and storing records in a database (step 814). Process 800 is shown to include providing a calendar invite 816 to meeting attendees 820 via a cloud service 812. User 860 may access (e.g., via a mobile application) tenant database 818 to receive records within the data and/or store information within tenant database 818.

In some embodiments, process 800 includes advancing a calendar request (step 804), creating a meeting booking based on the request (step 808) and provide this data to cloud service 812 to generate a calendar invite (816). Then, this calendar invite may be provided to meeting attendees 820.

Figure 8B:
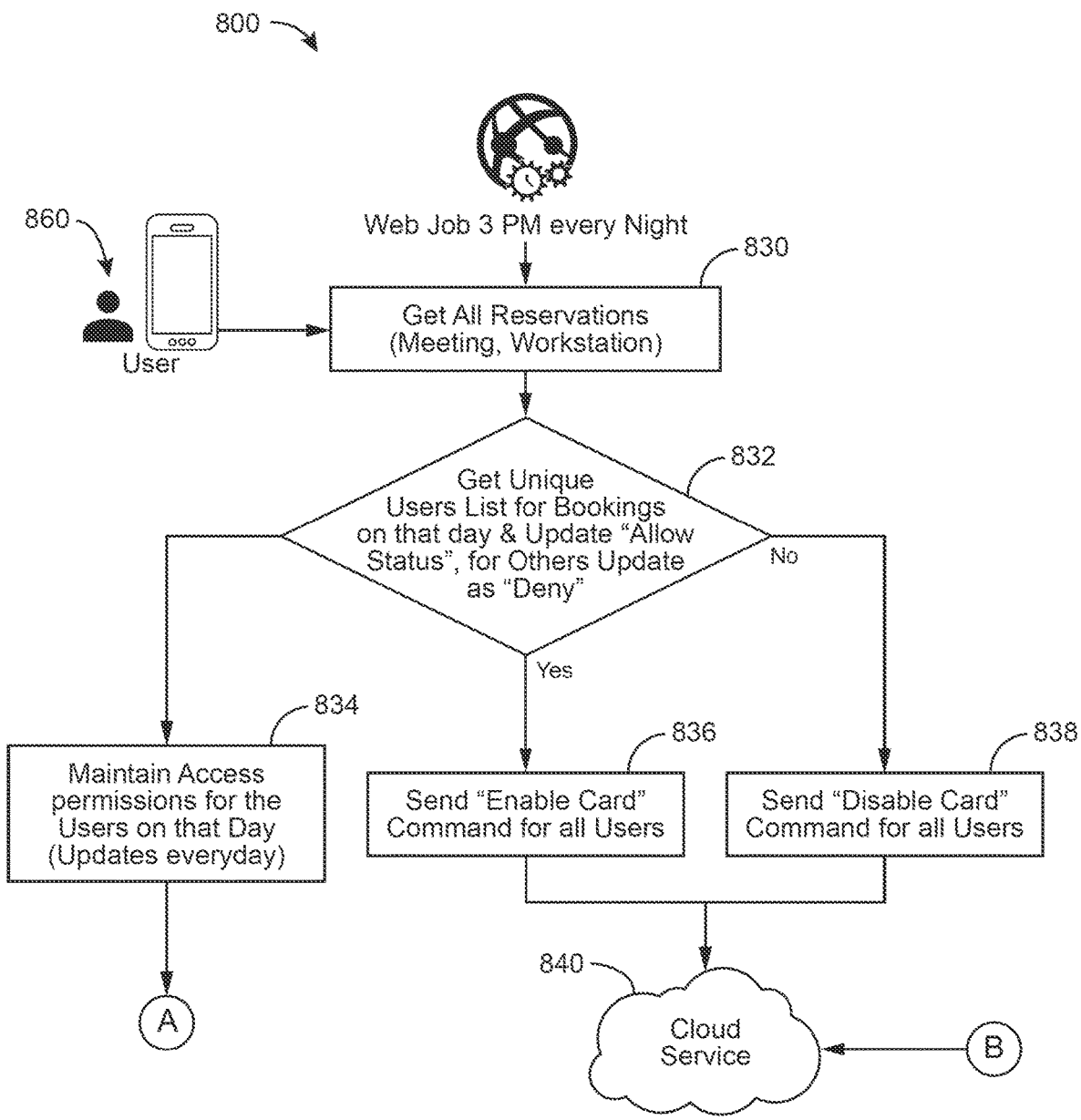
FIG. 8B is a flow diagram of a process for processing a received access request for entrance into a building, which can be implemented by the controller of FIG. 6, according to some embodiments.

Referring now to FIG. 8B, process 800 is shown to continue, according to some embodiments. Process 800 as shown in FIG. 8B may be configured to show a process for performing a web job at an interval of time (e.g., every night, every hour, etc.). In some embodiments, the web job is configured to process the received access requests from the one or more potential building occupants.

Process 800 is shown to include user 860 providing reservations (step 830) to the system (e.g., controller 602, etc.). Process 800 is shown to include retrieving unique users list for bookings on data and updating status to "allow" while updating status for others as "deny" (step 832). In the event that the unique bookings are not accepted, a signal may be provided to disable an access device (e.g., card, badge, mobile application, etc.) (step 838) for the potential building occupant. In the event that the unique bookings are accepted, an enabling signal may be provided to enable an access device (e.g., card, badge, mobile application, etc.) (step 838) for the potential building occupant.

Process 800 is shown to include maintaining access permissions for the users on the current data (step 834). In some embodiments, this is performed regardless of whether requests for bookings are accepted or not accepts. The decisions and/or processes for enabling/disabling access devices may be routed to cloud service 840, which can then be accessed and connected with mobile devices via mobile access (step 856).

Figure 8C:
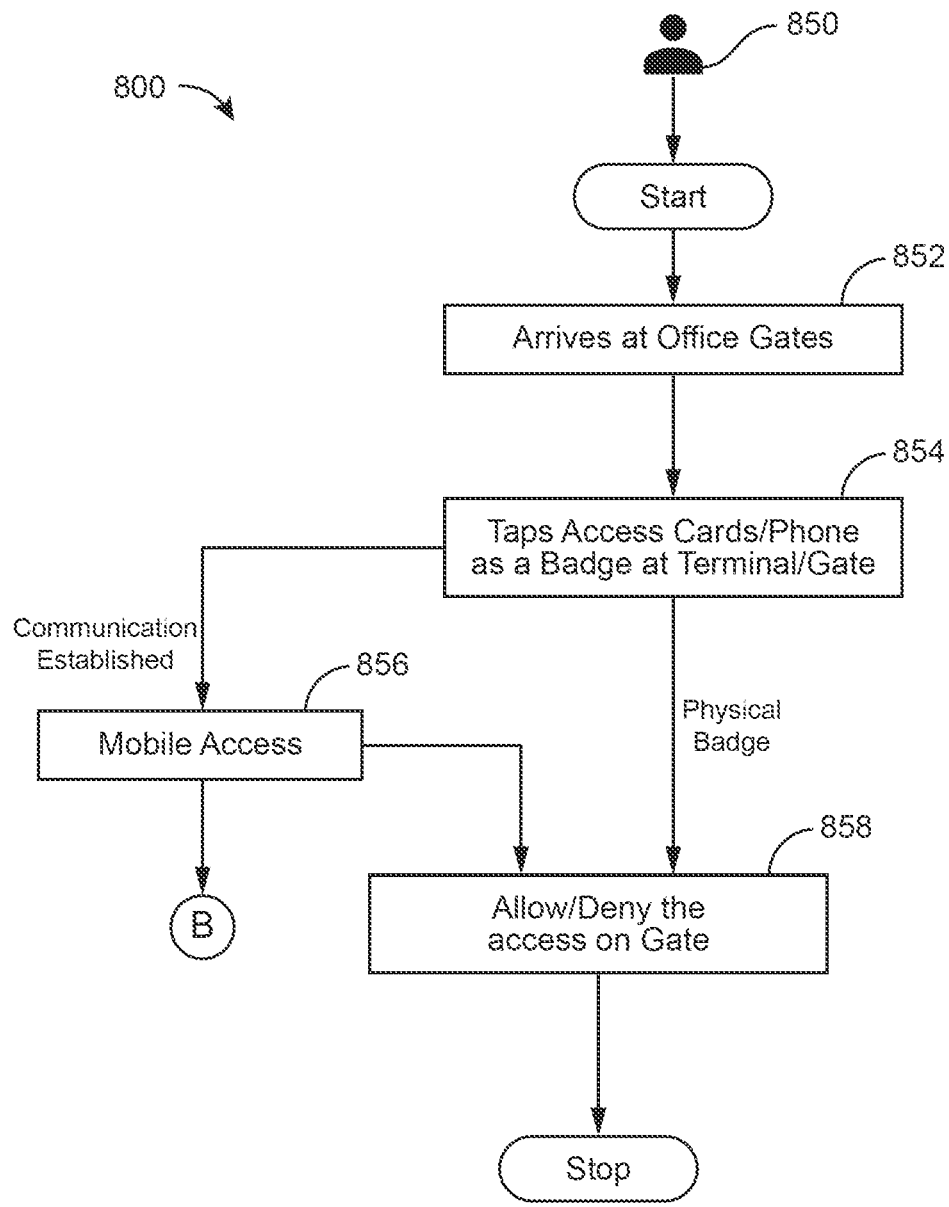
FIG. 8C is a flow diagram of a process for using capacity-based conditional access to enter a building, which can be implemented by the controller of FIG. 6, according to some embodiments.

Referring now to FIG. 8C, process 800 is shown to continue, according to some embodiments. Process 800 as shown in FIG. 8C may be configured to show a process to entering building 10 after the access request has been received and processed. Process 800 is shown to include arriving at office door (step 852). Process 800 is shown to include using the access code at the office door (step 854). The access code may be on a badge (step 740) or user device (e.g., smartphone, as a code, etc.) (step 738) of the user and as such, may establish a communication (e.g., near field communication (NFC), radio frequency identification (RFID), etc.) with the powered identification device (e.g., RFID reader, badge reader, code scanner, etc.). Process 800 is shown to include allowing or denying access into the building (step 858). In some embodiments, the access code is provided to the user of application 506 (e.g., building occupant 502, user 860, etc.).

Figure 9A:
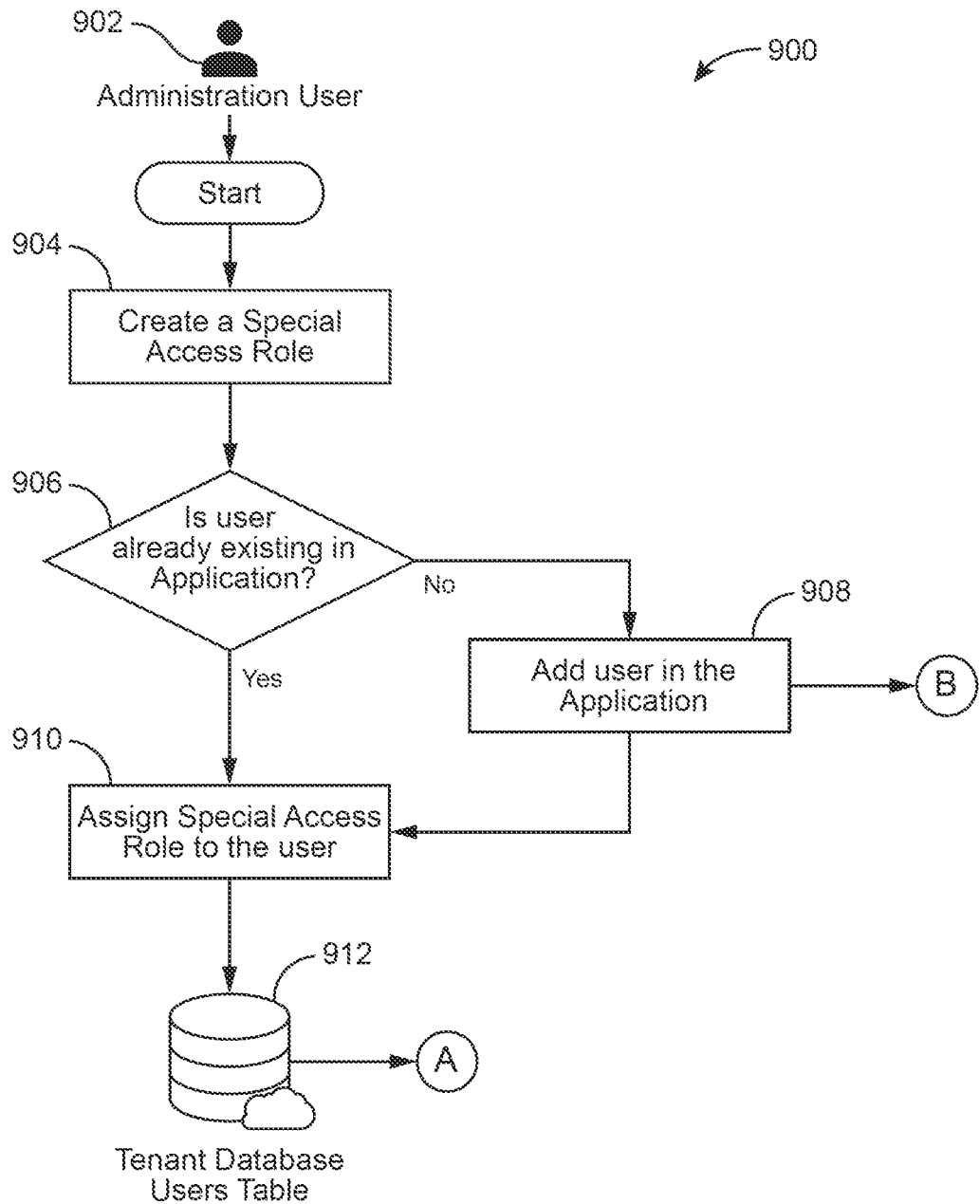
FIG. 9A is a flow diagram of a process providing an access request to a building, which can be implemented by the controller of FIG. 6, according to some embodiments.

Referring now to FIG. 9A, a process 900 for requesting and attending a meeting based on capacity-based conditional access is shown, according to some embodiments. The methods of process 900 can be performed by any of the processing devices disclosed herein, such as controller 602. In some embodiments, the data transfer and/or operations within process 900 are performed at least in part by application 506, which may be stored within controller 602 and hosted on user device 504. In some embodiments, process 800 provides conditional access to a building employee attempting to schedule a meeting via application 506.

Process 900 is shown to include creating a special access role for an administration user (steps 902-904). A special role may include any type of role that affects the credentials of the request. For example, a manager may have distinctly different credentials than a warehouse worker. Of course, multiple different types and traits associated with special access can be considered and are not limited to those described herein.

Process 900 is shown to include determining if the administration user already exists in the application (step 906). Process 900 is shown to include, in response to determining that the user does not already exist in the application, adding the user to the application (step 908). Process 900 is shown to include, in response to determining that the user already exists in the application, assigning a special role to the user (step 910) and storing that information in database 912. In some embodiments, once the user has been added to the application, this information may be provided to the access control system (step 924) (e.g., controller 602, etc.).

Figure 9B:
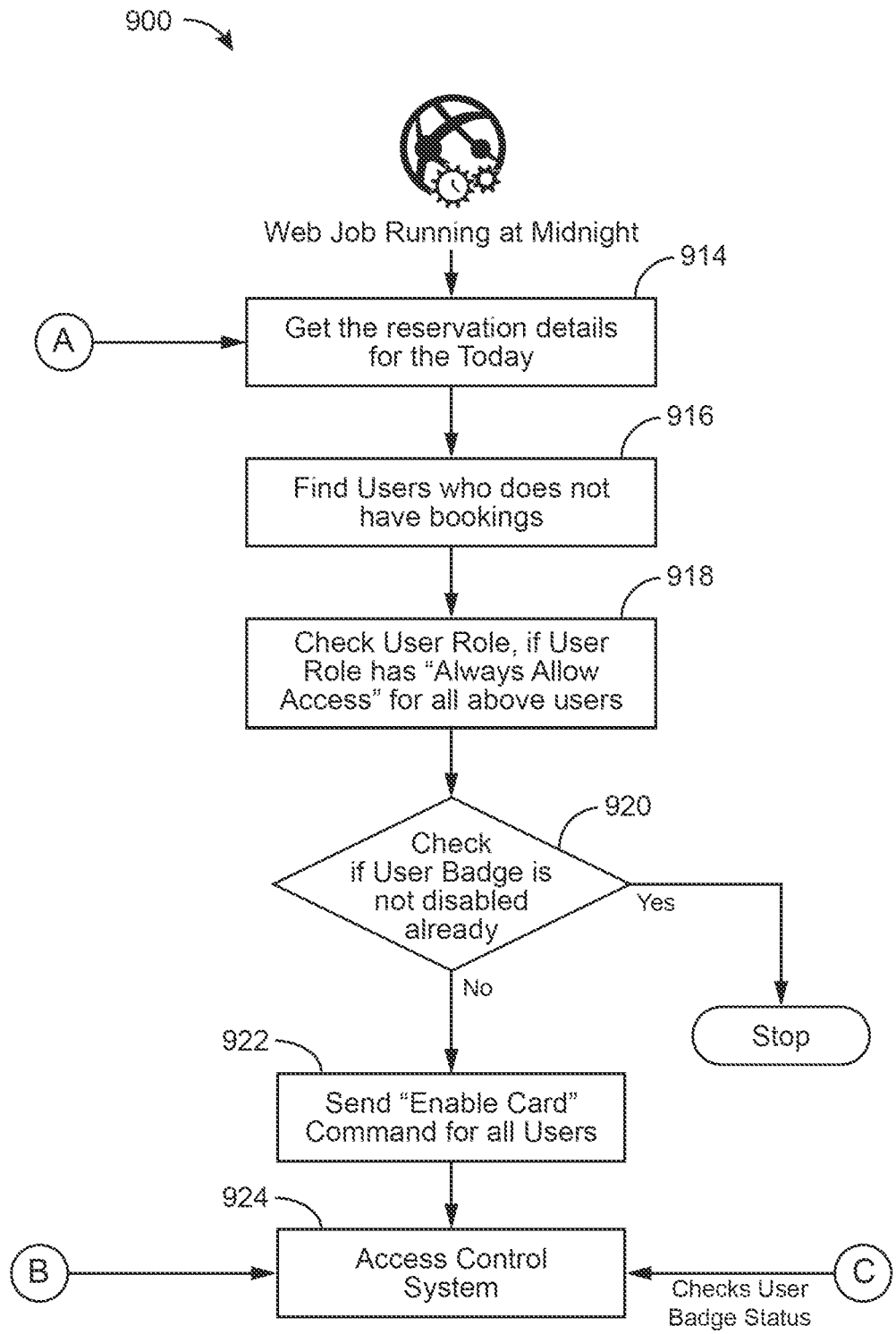
FIG. 9B is a flow diagram of a process for processing a received access request for entrance into a building, which can be implemented by the controller of FIG. 6, according to some embodiments.

Referring now to FIG. 9B, process 900 is shown to continue, according to some embodiments. Process 900 is shown to include receiving the reservation details for reservations scheduled for the current day (step 914). Process 900 is shown to include determining the users who do not have bookings (step 916). Process 900 is shown to include checking the user role to determine if the user role indicates that the user always has access (step 918). Process 900 is shown to include, in response to determining that the user does always have access, providing the access code (e.g., enable the user's badge, generate a code for the user, etc.) to the user (step 922). Process 900 is shown to include, in response to determining that the user does not always have access, do not enable the access code for the user. In some embodiments, these updates to the access for one or more users can be updated in access control system 924, which may be included partially or entirely within controller 602.

Figure 9C:
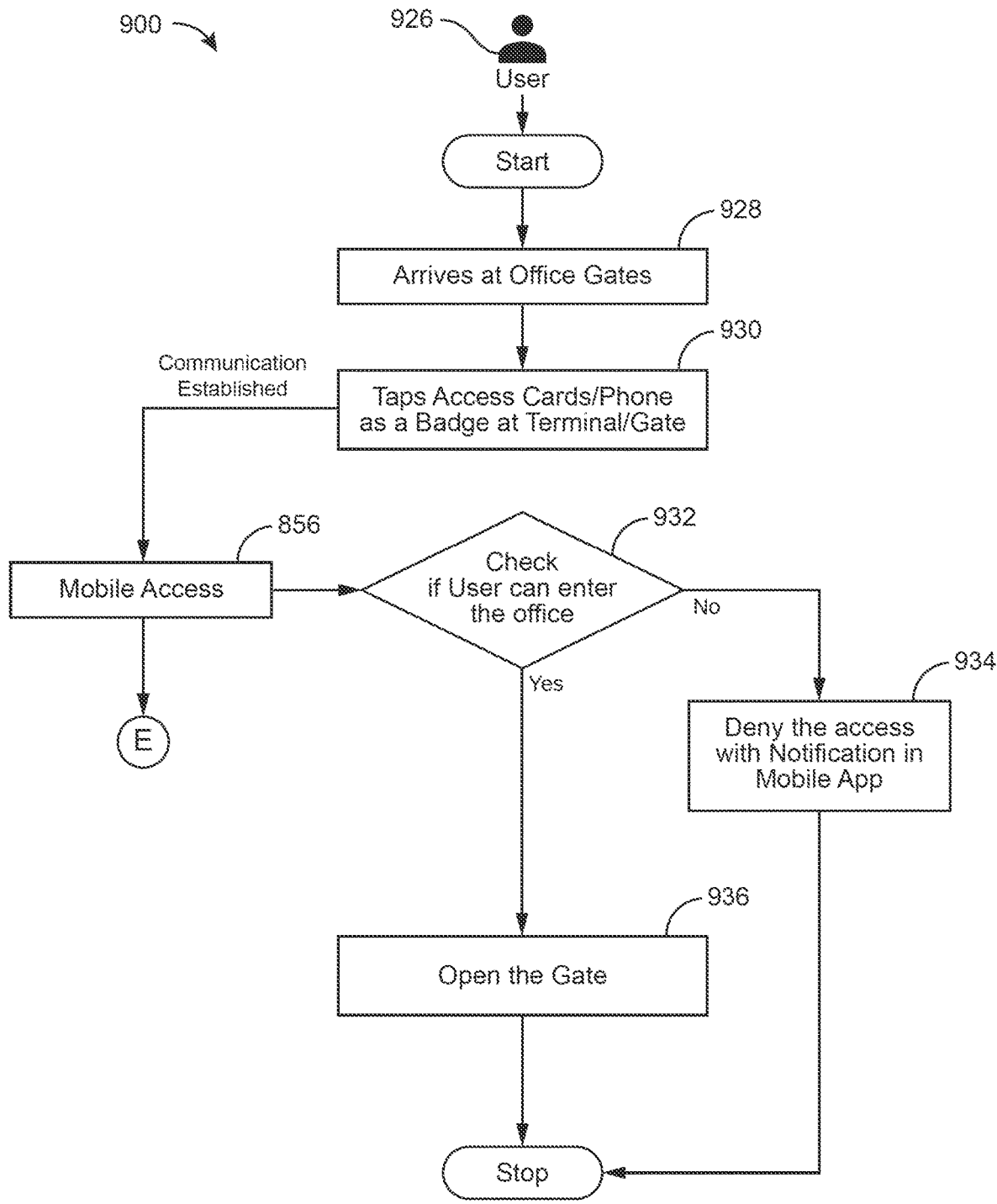
FIG. 9C is a flow diagram of a process for using capacity-based conditional access to enter a building, which can be implemented by the controller of FIG. 6, according to some embodiments.

Referring nowt to FIG. 9C, process 900 is shown to continue, according to some embodiments. Process 900 as shown in FIG. 9C may be configured to show a user entering the building in response to the user's access request being received and processed. Process 900 is shown to include arriving at the building door (step 928). Process 900 is shown to include using the access code to enter the building (step 930). Process 900 is shown to include determining if the user is allowed to enter the building. Process 900 is shown to include, in response to determining that the user cannot enter the building, deny access to the user and provide a notification to the user via the application (step 934). Process 900 is shown to include, in response to determining that the user can enter the building, open the door and allow the user to enter the building (step 936).

Visitor Access Integration

Figure 10:
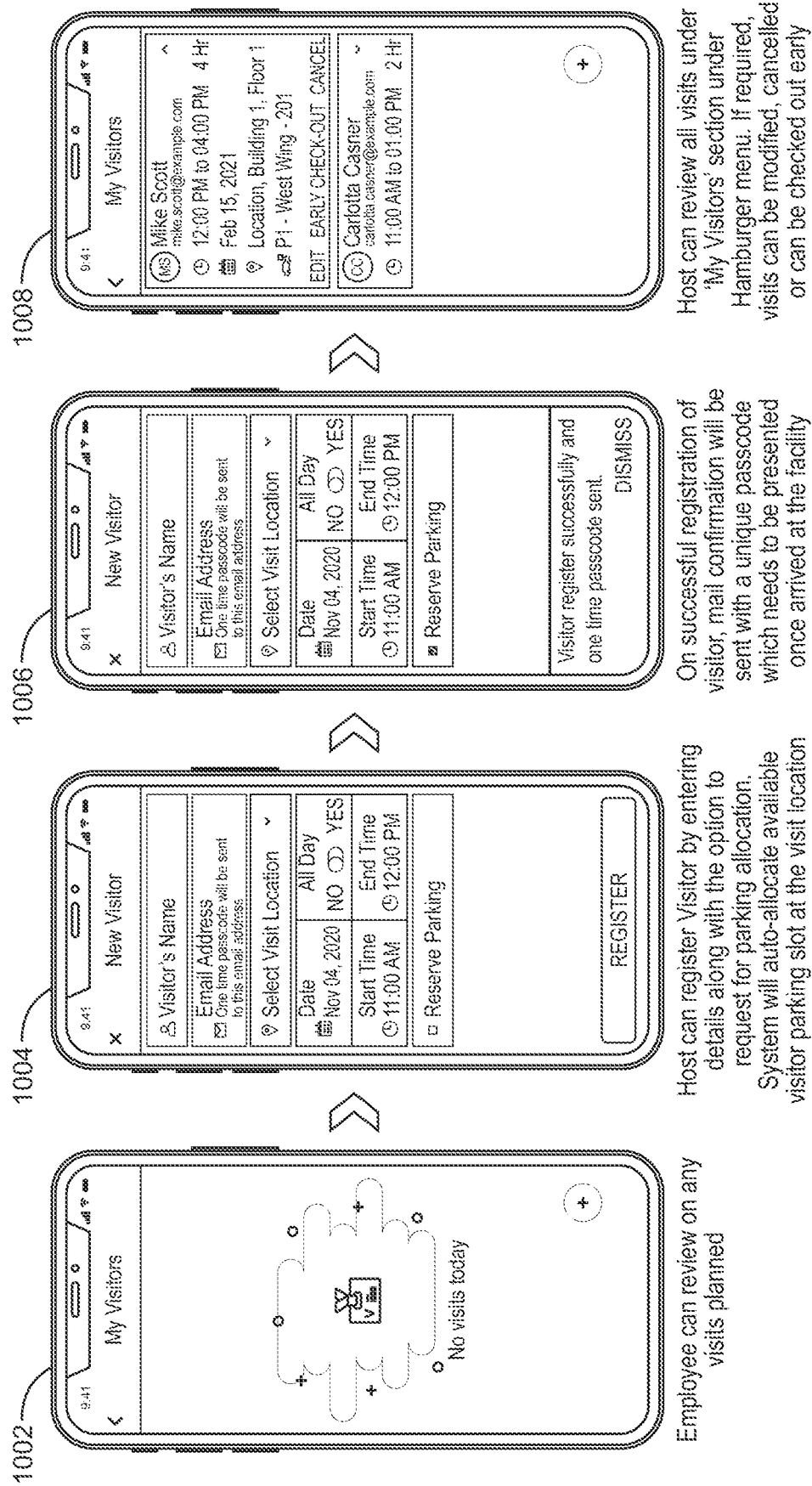
FIG. 10 is a diagram of several interfaces for displaying the process of completing visitor access to a building, according to some embodiments.

Referring now to FIG. 10, a diagram for showing steps for preparing for a visit to a building is shown, according to some embodiments. FIG. 10 is shown to include interfaces 1002-1008. In some embodiments, the interfaces shown in FIG. 10 are generated by application 506 as described above. In some embodiments, the methods disclosed in FIG. 10 may be similar to the methods performed by potential building occupant 502 for requesting access to building 10. In some embodiments, the user does not have to be a building employee and may simply be a visitor to building 10.

Interface 1002 may be configured to show some or all of the visits planned by a user of the application 506. As shown in FIG. 10, interface 1002 indicates that the user has no visits planned to building 10. Interface 1004 shows how a visitor can schedule a visit to building 10 via application 506, in some embodiments. The user (e.g., potential building occupant 502, etc.) can provide the user's name, email address, specific visiting location, date, duration, start time, end time, and parking information. In some embodiments, the system (e.g., system 500, controller 602, etc.) may automatically allocate a parking slot for the user in the event that the user requests parking.

In some embodiments, the parking selection can be integrated with the conditional access functionality in application 506. For example, the user may be able to select a parking space type (e.g., location, preferred parking, luxury parking, etc.) via application 506 and a parking category (e.g., employee, visitor, manager, etc.). Application 506 may provide a visual display of available parking spots that allows the user to select a preferred spot (e.g., which can be based on their selected parking space type, etc.). Once reserved, the reservation data may be provided to controller 602 such that controller 602 can incorporate the reservation data into capacity monitoring. For example, controller 602 now knows that an additional occupant will be present at the building following their parking reservation time.

Interface 1006 may be configured to show successful registration has occurred. While not shown in FIG. 10, application 506 may be displaying interfaces 1002-1008 and integrating with controller 602 to account for capacity-based conditional access. For example, once the visitor registration is complete, the user's information is provided to user database 616 to be considered by conditional access manager 614 (as discussed in detail above). Additionally, controller 602 may be able to account for the user's presence when monitoring the capacity of the building 10.

Interface 1008 may be configured to show all of the visits that the visitor has made to building 10. In some embodiments, this data is similarly stored in controller 602 such that controller 602 can account for the previous visitors to building 10. This may allow controller 602 to perform contact tracing, determine which zones of building 10 have been recently used and are thus potentially contaminated, and other criteria.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for providing access to a building for a user, the method performed by one or more processing circuits comprising one or more processors and non-transitory computer readable media, the method comprising:
   determining, by the one or more processing circuits, a capacity restraint for the building, the capacity restraint comprising a maximum number of occupants allowed within the building;
   receiving, at the one or more processing circuits, a requested reservation for a space in the building and a health assessment of the user, the requested reservation including an expected number of occupants;
   determining, by the one or more processing circuits, whether to grant the requested reservation based on the health assessment of the user and whether a total number of occupants resulting from the requested reservation and current reservations within the building would exceed the capacity restraint if the requested reservation were granted, wherein:
   the requested reservation is granted responsive to determining that the total number of occupants resulting from the requested reservation and the current reservations within the building would not exceed the capacity restraint and the health assessment indicates the user is healthy, and
   the requested reservation is denied responsive to determining that the total number of occupants resulting from the requested reservation and the current reservations within the building would exceed the capacity restraint or the health assessment indicates the user is unhealthy; and
   responsive to determining to grant the requested reservation, via the one or more processing circuits, automatically providing credentials to at least one of an access control system of the building or a device of the user, the credentials configured to cause the access control system to grant access to the user in accordance with one or more parameters of the requested reservation.

2. The method of claim 1, wherein causing the access control system to grant access to the user in accordance with the one or more parameters comprises granting access in accordance with at least one of a time of the requested reservation, a date of the requested reservation, a security level of the user, or a health assessment of the user.

3. The method of claim 1, wherein determining whether to grant the requested reservation based on the capacity restraint and current reservations comprises verifying that the requested reservation for the space in the building conforms to capacity restrictions provided by a regulatory entity, the capacity restrictions comprising the capacity restraint.

4. The method of claim 1, wherein:
automatically providing the credentials to at least one of the access control system of the building or the device of the user comprises determining a level of access associated with at least one of the requested reservation or the credentials; and
the credentials are configured to cause the access control system to selectively grant access based on the level of access.

5. The method of claim 1, wherein receiving the requested reservation for the space in the building comprises receiving the requested reservation via a mobile application on the device of the user.

6. The method of claim 1, wherein providing the credentials to at least one of the access control system of the building or the device of the user comprises providing the credentials for a duration of time, the duration of time limited based on at least one of the capacity restraint or current reservations within the building.

7. The method of claim 1, wherein automatically providing the credentials to at least one of the access control system of the building or the device of the user comprises:
providing the credentials to the device of the user via a mobile application;
receiving, via the mobile application, the request to modify the requested reservation for the space in the building;
determining whether to grant the request based on the capacity restraint and current reservations within the building; and
responsive to determining to grant the request, providing a notification to the device of the user that the request has been granted.

8. An access control system (ACS) for providing access to a building for a user, the ACS comprising a controller, the controller comprising a processing circuit configured to:
determine a capacity restraint for the building, the capacity restraint comprising a maximum number of occupants allowed within the building;
receive a requested reservation for a space in the building and a health assessment of the user, the requested reservation including an expected number of occupants and a requested time period;
determine whether to grant the requested reservation based on the health assessment and whether a total number of occupants resulting from the requested reservation, anticipated reservations within the building for the requested time period, and current reservations within the building for the requested time period would exceed the capacity restraint during the requested time period if the requested reservation were granted, wherein:
the requested reservation is granted responsive to determining that the total number of occupants resulting from the requested reservation, the anticipated reservations within the building for the requested time period, and the current reservations within the building would not exceed the capacity restraint and the health assessment indicates the user is healthy, and
the requested reservation is denied responsive to determining that the total number of occupants resulting from the requested reservation, the anticipated reservations within the building for the requested time period, and the current reservations within the building would exceed the capacity restraint or the health assessment indicates the user is unhealthy; and
responsive to determining to grant the requested reservation, automatically provide credentials to a device of the user, the credentials configured to cause the access control system to grant access to the user in accordance with one or more parameters of the requested reservation.

9. The ACS of claim 8, wherein causing the access control system to grant access to the user in accordance with the one or more parameters comprises granting access in accordance with at least one of a time of the requested reservation, a date of the requested reservation, a security level of the user, or a health assessment of the user.

10. The ACS of claim 8, wherein determining whether to grant the requested reservation based on the capacity restraint and current reservations comprises verifying that the requested reservation for the space in the building conforms to capacity restrictions provided by a regulatory entity, the capacity restrictions comprising the capacity restraint.

11. The ACS of claim 8, wherein:
automatically providing the credentials to the device of the user comprises determining a level of access associated with at least one of the requested reservation or the credentials; and
the credentials are configured to cause the access control system to selectively grant access based on the level of access.

12. The ACS of claim 8, wherein receiving the requested reservation for the space in the building comprises receiving the requested reservation via a mobile application on the device of the user.

13. The ACS of claim 8, wherein providing the credentials to the device of the user comprises providing the credentials for a duration of time, the duration of time limited based on at least one of the capacity restraint and current reservations within the building.

14. The ACS of claim 8, wherein automatically providing the credentials to the device of the user comprises:
providing the credentials to the device of the user via a mobile application;
receiving, via the mobile application, a request to modify the requested reservation for the space in the building;
determining whether to grant the request based on the capacity restraint and current reservations within the building; and
responsive to determining to grant the request, providing a notification to the device of the user that the request has been granted.

15. One or more non-transitory computer readable media having instructions stored thereon that, when executed by one or more processors, cause the one or more processors to implement operations comprising:
determining a capacity restraint for a building, the capacity restraint comprising a maximum number of occupants allowed within the building;
receiving a requested reservation for a space in the building and a health assessment of a user, the requested reservation including an expected number of occupants;
determining whether to grant the requested reservation based on the health assessment and whether a total number of occupants resulting from the requested reservation and current reservations within the building would exceed the capacity restraint if the requested reservation were granted, wherein:
the requested reservation is granted responsive to determining that the total number of occupants resulting from the requested reservation and the current reservations within the building would not exceed the capacity restraint and the health assessment indicates the user is healthy, and the requested reservation is denied responsive to determining that the total number of occupants resulting from the requested reservation and the current reservations within the building would exceed the capacity restraint or the health assessment indicates the user is unhealthy;

verifying that the requested reservation for the space in the building conforms to capacity restrictions provided by a regulatory entity, the capacity restrictions comprising the capacity restraint; and responsive to determining to grant the requested reservation, automatically providing credentials to at least one of an access control system of the building or a device of the user, the credentials configured to cause the access control system to grant access to the user in accordance with one or more parameters of the requested reservation.

16. The media of claim 15, wherein causing the access control system to grant access to the user in accordance with the one or more parameters comprises granting access in accordance with at least one of a time of the requested reservation, a date of the requested reservation, a security level of the user, or a health assessment of the user.

17. The media of claim 15, wherein:

automatically providing the credentials to at least one of the access control system of the building or the device of the user comprises determining a level of access associated with at least one of the requested reservation or the credentials; and the credentials are configured to cause the access control system to selectively grant access based on the level of access.

18. The media of claim 15, wherein receiving the requested reservation for the space in the building comprises receiving the request via a mobile application on the device of the user.

19. The media of claim 15, wherein providing the credentials to at least one of the access control system of the building or the device of the user comprises providing the credentials for a duration of time, the duration of time limited based on at least one of the capacity restraint and current reservations within the building.

20. The media of claim 15, wherein automatically providing the credentials to at least one of the access control system of the building or the device of the user comprises:

providing the credentials to the device of the user via a mobile application;

receiving, via the mobile application, a request to modify the requested reservation for the space in the building;

determining whether to grant the request based on the capacity restraint and current reservations within the building; and responsive to determining to grant the request, providing a notification to the device of the user that the request has been granted.

* * * * *